Sept. 7, 1926.                                                                1,599,163
                          J. W. BUCHANAN
     PROCESS OF SEPARATING ACCUMULATING WATER FROM COLLECTING TURPENTINE GUM
                          Filed Oct. 30, 1923

Inventor
John W. Buchanan
By
Attorney

Patented Sept. 7, 1926.

1,599,163

UNITED STATES PATENT OFFICE.

JOHN W. BUCHANAN, OF FOLKSTON, GEORGIA.

PROCESS OF SEPARATING ACCUMULATING WATER FROM COLLECTING TURPENTINE GUM.

Application filed October 30, 1923. Serial No. 671,681.

My invention relates to improvements in processes of separating accumulating water from collecting turpentine gum, employing a receptacle in such manner that water which may enter the receptacle will stratify and the stratum of water will be allowed to discharge without discharging the valuable material in the receptacle.

The present embodiment of the invention is particularly designed and adapted for use as a turpentine collecting receptacle having means to prevent the overflow of the fresh or incoming and floating turpentine, as now frequently occurs in wet or rainy weather, since the turpentine collecting receptacle being exposed on the outside of the turpentine bearing tree, the receptacle gathers rain water and before the superposed or floating turpentine has reached the state to cause it to settle it has come up to and overflows the upper marginal edges of the receptacle, thus resulting in great waste and loss.

The primary object of the invention is to provide a generally improved collecting and separating receptacle of the type indicated, which will be exceedingly simple in construction, cheap of manufacture and efficient in use.

A further and very important object is to provide simple liquid separating and draining means which may be readily incorporated in or attached to any ordinary receptacle or vessel and, where the latter is used in the collection of turpentine, such means or attachment providing an overflow port or conduit adapted to drain the liquid of normally lighter specific gravity, such for example as water, when such lighter liquid and liquids of relatively greater specific gravity reach predetermined heights or levels in the collecting receptacle.

Figure 1:
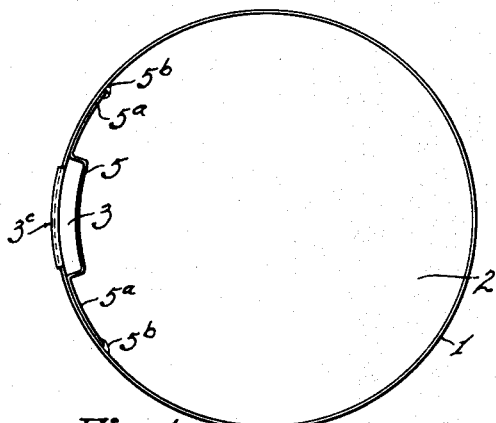

Referring to the drawings, forming a part of this specification, Figure 1 is a top plan view of a liquid collecting and separating receptacle, of the cylindrical or cup type, constructed in accordance with this invention.

Figure 2:
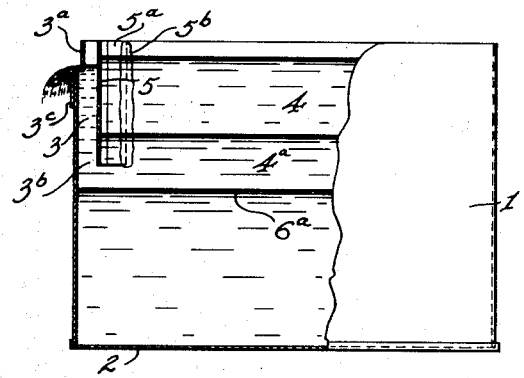

Fig. 2, a side elevation, partly in section, illustrating the same as a turpentine collecting receptacle as with liquids of different specific gravities, such for example,—as turpentine and rain water, the liquid draining conduit being shown as discharging the rain water when the incoming or floating turpentine has reached a predetermined height therein.

Figure 3:
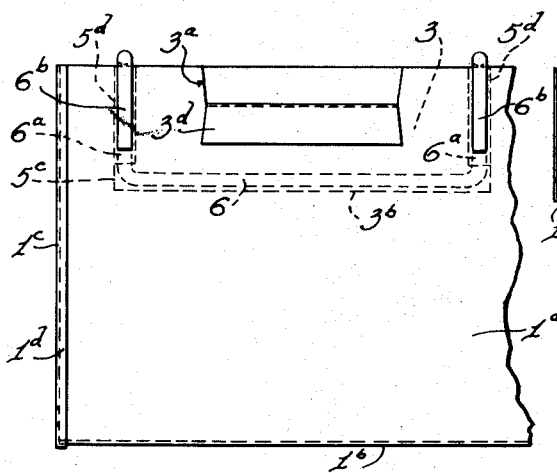

Fig. 3, a fragmentary side elevation of a modified form attached to or incorporated in a collecting receptacle of the elongated or trough shaped type.

Figure 4:
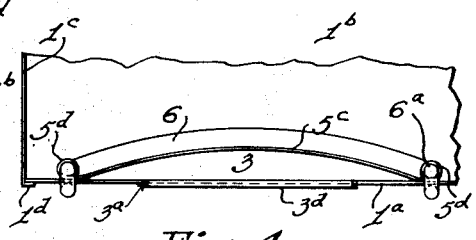

Fig. 4, a fragmentary top plan or edge view of the same.

Figure 5:
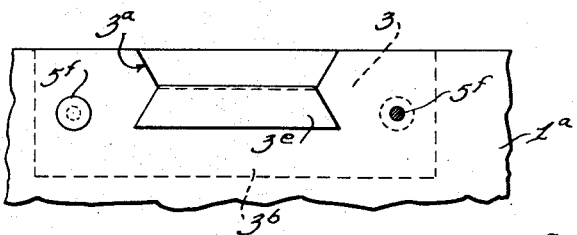

Fig. 5, a fragmentary side elevation of a further modified form or attachment.

Figure 6:
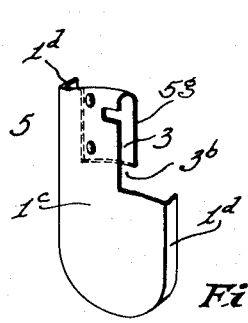

Fig. 6, a fragmentary perspective view of a further modification incorporated in one of the ends of the turpentine receptacle of the type shown in Figs. 3 and 4.

Similar numerals of reference designate like parts throughout all the figures of the drawings.

The liquid collecting receptacle may be of any suitable and convenient form or type. In the present instance, I have shown my improvements applied to a receptacle of the cylindrical or cup type, as shown in Figs. 1 and 2 of the drawings, and to a receptacle of the elongated or trough shaped type such as now commonly employed in the collection of turpentine, as illustrated in Figs. 3 to 6 of the drawings.

In the form shown in Figs. 1 and 2 the cylindrical vessel or cup comprises the usual cylindrical body 1, with a bottom 2, while in the form shown in the remaining figures of the drawings the sides $1^a$, and bottom $1^b$, are formed of a curved or trough shaped section with ends $1^c$, provided with flanges $1^d$, to engage over the marginal edges of the side and bottom forming members.

In carrying out my invention I provide the receptacle with a vertically extending passage or conduit 3, located, in the present instance, at one side of the receptacle and provided at its upper portion with an outlet portion $3^a$, located approximately at the desired or predetermined level of the superposed liquid 4, such for example,—as the incoming or floating turpentine, as illustrated in Fig. 2 of the drawings, said passage or conduit 3 being provided with a vertically or downwardly spaced inlet portion $3^b$, adapted to drain the liquid or water $4^a$, of lighter specific gravity than the accumulated and thickened turpentine when exposed for a period and at a predetermined level of the superposed or incoming liquid in the receptacle such as fresh turpentine from the tree.

The draining conduit or passage 3 may be formed in any suitable and convenient manner and so likewise the outlet and inlet ports 3ª and 3ᵇ.

In the present instance, I have formed the conduit or passage 3 by means of a supplemental strip or bridge member 5, extending from the top of the receptacle to the desired level or point for forming the inlet portion and òf a depth corresponding approximately to the depth of the floating or incoming turpentine before it has assumed a state which causes it to settle in the receptacle and assume a line of division or level, as at 6ª in Fig. 2 of the drawings.

In the forms shown in Figs. 1 and 2 the bridge member 5 is in the specific form of a curved segment provided with attaching flanges 5ª, the latter being secured, in the present instance, by means of lines of vertically extending soldering 5ᵇ, and it will be seen that the conduit or passage 3 is formed conjointly by the outer wall of the receptacle below the notch or outlet 3ª and the bridge member 5.

As a means of forming the bridge member for use as an attachment which may be quickly attached to or detached from the side wall of the receptacle and which may be readily adjusted thereon, the bridge member may take the specific form shown in Figs. 3 and 4 of the drawings, and in which instance, such bridge member 5ᶜ is provided with looped or beaded marginal portions 5ᵈ, secured about the side arms 5ª, of a depending wire loop 6, extending into the sides of the receptacle, the upper ends of the side members 6ª terminating in clamping hooks or members 6ᵇ, adapted to extend over and frictionally engage the upper marginal edge of the receptacle wall, as shown.

The outlet portion 3ª may be formed by means of a notch provided by a struck out tongue 3ᶜ, in the upper marginal edges of the receptacle and turned down, as shown in Figs. 1 and 2 of the drawings, or in the form of struck out tongues 3ᵈ and 3ᵉ, as shown in Figs. 3 and 4 and Fig. 5 of the drawings, respectively.

In Fig. 5 the bridge section 5ᵉ is formed separate and secured by attaching elements or rivets 5ᶠ.

If desired, the conduit or passage 3 and the outlet and inlet ports communicating therewith may be formed in one of the ends 1ᶜ of the receptacle of the type shown in Figs. 3 and 4 of the drawings by providing an extension 5ᵍ at the top of the end 1ᶜ and bending such extension downwardly, as shown in Fig. 6 of the drawings, the outlet port being formed by means of a slot 5ʰ.

By reason of the construction above described, it will be apparent that the initial inflowing turpentine will be prevented from overflowing the edges of the receptacle in wet or rainy weather when a considerable portion of rain water has been caught in the receptacle, as shown, and it will be understood also that such initial or floating turpentine will later on assume a state which will cause it to settle in the receptacle, as shown.

It will be seen also that my improved art or process of collecting turpentine gum separating and draining water therefrom consists in accumulating the water and the settled and floating turpentine gum in stratas and draining the water through a communicating passage or port by and through the action of the accumulating floating and settling turpentine stratas in the collecting receptacle.

Having thus described some of the embodiments of my invention, without having attempted to set forth all the forms in which it may be made, or all the modes of its use, what I claim and desire to secure by Letters Patent is,—

The process of collecting turpentine gum in a vessel provided with an overflow outlet near the top thereof and a vertical by-pass leading thereto, said by-pass having its inlet spaced a substantial distance above the bottom of the vessel, which consists in introducing fresh turpentine gum and water into said vessel, allowing the turpentine gum and water to stratify and part of the gum to partially thicken and settle thru the water stratum to the bottom of the vessel, and allowing the stratum of water between the floating fresh gum and the sunken gum to overflow through said by-pass and outlet, and continuing said procedure as long as water is introduced into said receptacle.

In testimony whereof I have affixed my signature.

JOHN W. BUCHANAN,